Figure 1:
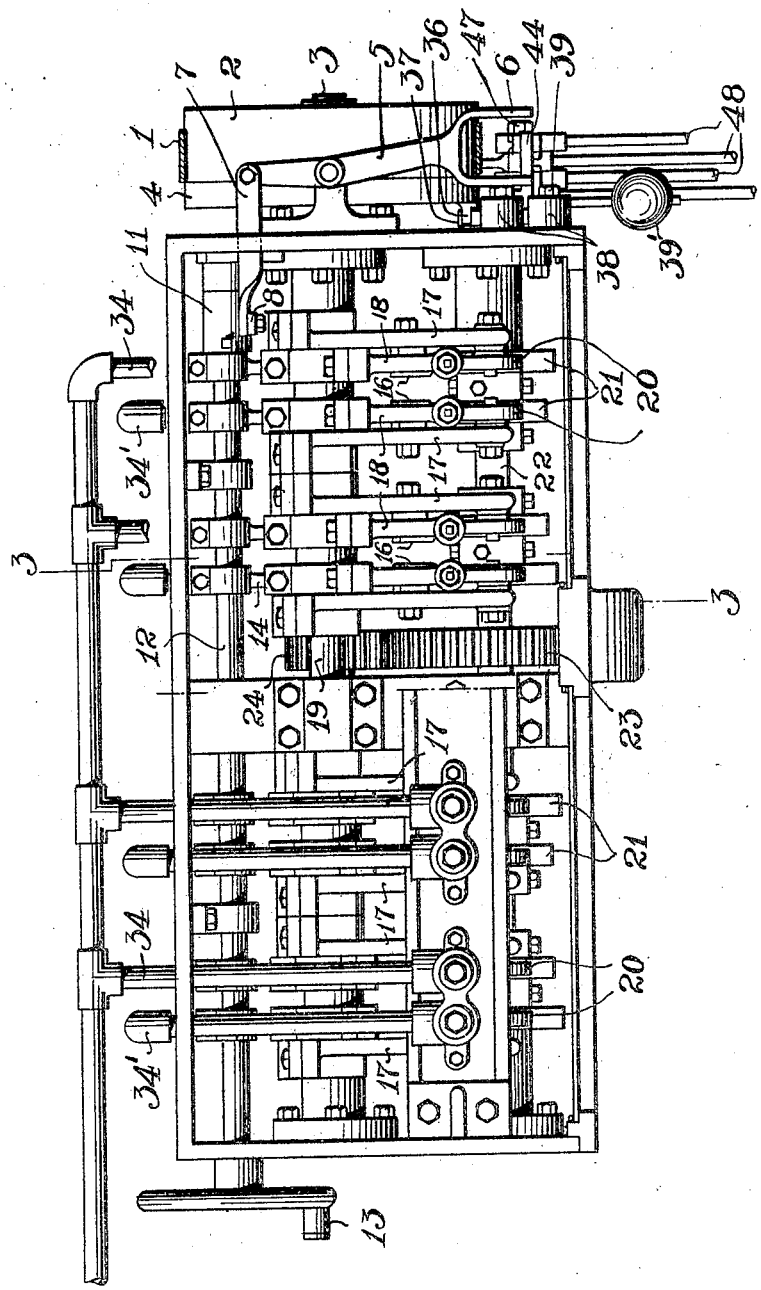

No. 802,971. PATENTED OCT. 31, 1905.
E. CARL & H. COULSTON.
VALVE MECHANISM.
APPLICATION FILED MAY 28, 1904.

3 SHEETS—SHEET 1.

WITNESSES:
John F. Gerbey Jr.
Utley E. Crane Jr.

INVENTORS
Emerson Carl and
BY Harry Coulston

Charles N. Butler
ATTORNEY.

No. 802,971. PATENTED OCT. 31, 1905.
E. CARL & H. COULSTON.
VALVE MECHANISM.
APPLICATION FILED MAY 28, 1904.
3 SHEETS—SHEET 2.
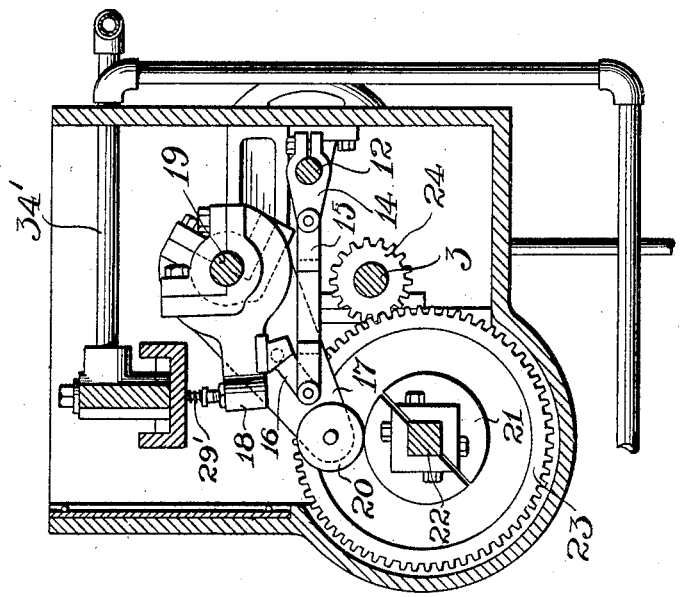
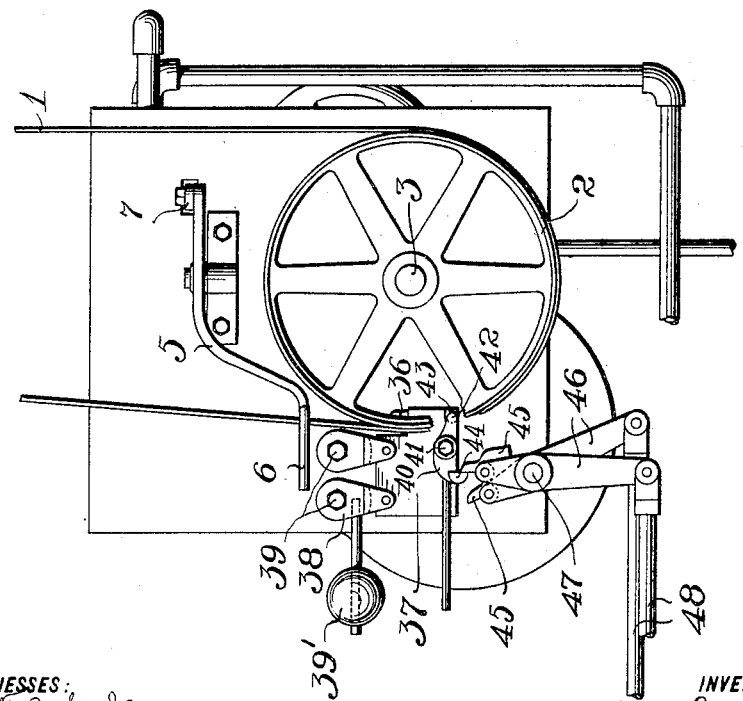
WITNESSES:
John F. Gerbey Jr.
Utley E. Crane Jr.
INVENTORS
Emerson Carl and
Harry Coulston
BY
Charles N. Butler
ATTORNEY.

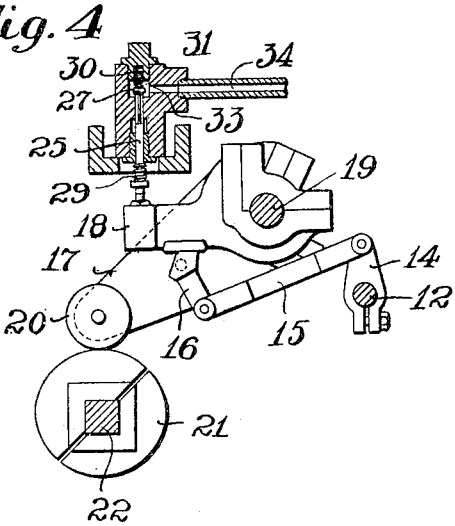
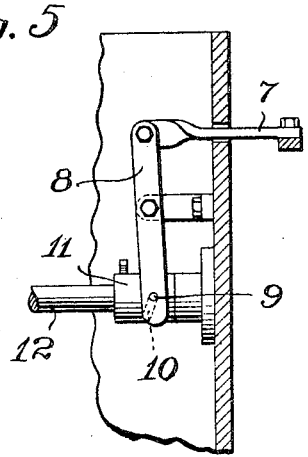
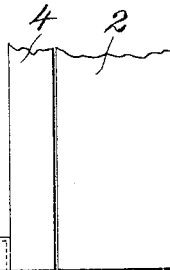
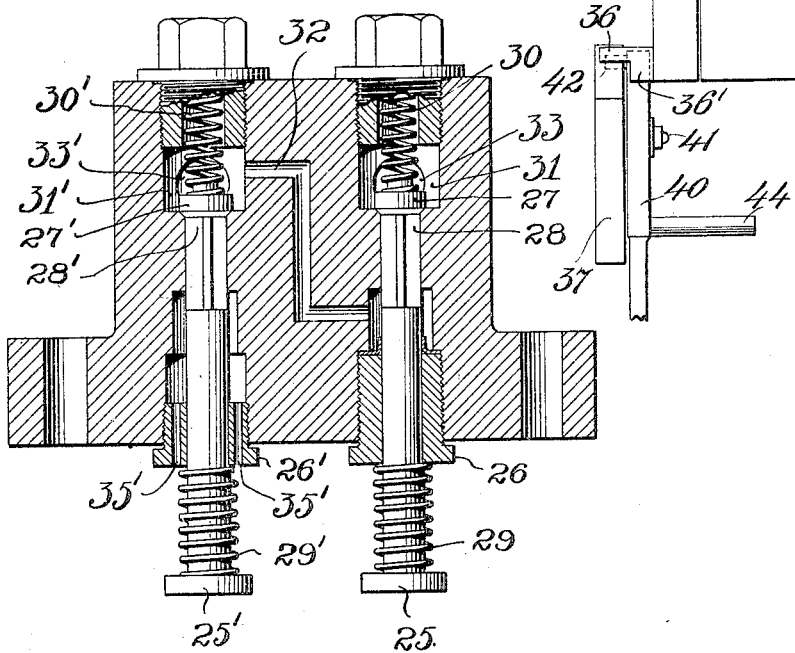

UNITED STATES PATENT OFFICE.

EMERSON CARL AND HARRY COULSTON, OF PHILADELPHIA, PENNSYLVANIA, ASSIGNORS TO THOMAS POTTER SONS AND COMPANY, INCORPORATED, OF PHILADELPHIA, PENNSYLVANIA.

VALVE MECHANISM.

No. 802,971.     Specification of Letters Patent.     Patented Oct. 31, 1905.

Application filed May 28, 1904. Serial No. 210,206.

*To all whom it may concern:*

Be it known that we, EMERSON CARL and HARRY COULSTON, citizens of the United States, and residents of Philadelphia, in the county of Philadelphia and State of Pennsylvania, have jointly invented certain new and useful Improvements in Valve Mechanisms, of which the following is a specification.

This invention relates to mechanism for operating a series of valves; and its primary object is to effect a sequential automatic operation thereof, while providing a ready manual control therefor, being adapted for use with mechanism for making inlaid fabrics, such as linoleum.

In the accompanying drawings, Figure 1 is a top plan view, partially in section, in illustration of the invention. Fig. 2 represents an end elevation thereof. Fig. 3 represents a sectional view taken on the line 3 3 of Fig. 1. Fig. 4 represents a second position of part of the mechanism shown in Fig. 3. Fig. 5 represents a view of part of the belt-shifting mechanism. Fig. 6 represents a vertical sectional view through a pair of valves, and Fig. 7 represents a plan view of details of the stop mechanism.

As shown in the drawings, a belt 1 is carried by a pulley 2, loose on the shaft 3, and is adapted to be moved into engagement with the pulley 4, fixed on the shaft. The belt is shifted by the fulcrumed lever 5, having the belt-engaging fork 6. The lever is operated by a link 7, connected thereto and to a fulcrumed lever 8, having a pin 9 working in a cam or angle slot 10 of a sleeve 11, the latter being fixed on a rocking shaft 12, operated by a crank 13.

Fixed to and rocked by the shaft 12 are the arms 14, connected by the links 15 to cams 16, the cams being fulcrumed on the levers 17 and bearing on the rocking levers 18 on the shaft 19. The levers 17 are provided with rollers 20, which ride on the cams 21, fixed to the shaft 22. This shaft has the spur-wheel 23 fixed thereon and engaged by the pinion 24, fixed on the shaft 3, the wheel having four times the circumference of the pinion in the construction shown. The levers 18 make contact with valve-stems 25 and 25', working in the gaskets 26 and 26' and having the puppets 27 and 27', connected therewith, seated on the ports 28 and 28', the puppets being lifted by the levers and depressed by the respective springs 29 30 and 29' 30'. The ports 28 and 28' communicate with the respective chambers 31 and 31', the chambers being connected by the passage 32 and communicating with the respective ports 33 and 33', connected with the pipes 34 and 34'. The port 28' also communicates with the passages 35' through the gasket 26'.

The several cams 21 are so arranged on the shaft 22 that when the cams 16 hold the levers 18 elevated with reference to the levers 17 a roller 20 of a lever 17 will rest on the deepest part of one of the cams 21 and elevate one of the puppets 27, while the companion cam 21 has a lower part in contact with the corresponding roller 20, permitting the corresponding puppet 27' to remain closed. In this position of the mechanism communication is opened between a pair of pipes 34 34' by way of the corresponding port 33, chamber 31, port 28, passage 32, chamber 31', and port 33', and the pipe 34 charges into the pipe 34'. When the shaft 22 revolves the cams 21 through a quarter-revolution, the elevated puppet 27 closes its port 28 and the puppet 27' opens its port 28', permitting the pipe 34' to exhaust through the port 33', chamber 31', port 28', and passages 35', and simultaneously a second puppet 27 is elevated, while its companion puppet 27' remains closed to charge from a second pipe 34 through the valve connections therewith into the corresponding pipe 34'. In like manner the successive valves are opened and closed to charge and exhaust. The intermittent movement of the shaft 22, which causes the successive operation of the valves, is effected by the intermittent movement of the pulley 4, connected therewith by the shaft 3 and the gears 23 and 24.

The pulley 4 has thereon a boss 36, adapted for engaging a stop 37, pivotally supported by the links 38, having the fulcrums 39. The pulley is revolved by the belt 1 when the stop is withdrawn from engagement with its boss and held stationary at the completion of a revolution by the reëngagement of the boss with the stop, whose restoration to its engaging position is aided by the counterweight 39', connected therewith.

A latch 40, having the fulcrum connection 41 with the stop and the pin 42, adapted to engage the notch 43 thereof, is provided with a boss 44, which normally lies in the path of the pawls 45, pivoted to the levers 46, the latter having the fulcrum 47, on which they are oscillated by reciprocating rods 48. When a pawl 45 is moved backward, it is tilted and passes the boss 44; but when it moves forward its engagement with the boss is positive, and thereby the stop 37 is withdrawn from the boss 36, permitting the pulley 4 to revolve. As the boss 36 descends its shoulder 36' strikes and tilts the latch 40, disengaging the boss 44 from the engaging pawl 45 and permitting the stop 37 to be restored to position for reëngaging the boss 36.

It will now be understood that when the shaft 12 is turned to shift the belt 1 into engagement with the driving-pulley 4 it simultaneously rocks the cams 16 to elevate the levers 18, by which the mechanism is operated and continues to operate until the shaft is reversed.

Having described our invention, we claim—

1. The combination of a valve, with valve-operating mechanism comprising a lever and a cam fulcrumed on said lever, substantially as specified.

2. The combination of a valve, with valve-operating mechanism, comprising a lever, a cam fulcrumed on said lever, and a lever movable by said cam, substantially as specified.

3. The combination of a valve, with valve-operating mechanism comprising a cam, a lever operated by said cam, a cam fulcrumed on said lever, and a second lever operated by said second cam, substantially as specified.

4. The combination of a valve, with valve-operating mechanism comprising a rotary shaft, a cam fixed on said shaft, a lever operated by said cam, a second lever, and a cam connecting said levers, substantially as specified.

5. The combination of a valve, with valve-operating mechanism comprising a fulcrumed cam, a rock-shaft, mechanism connecting said shaft and cam whereby the rocking of said shaft rocks said cam, and separate mechanism for reciprocating said cam, substantially as specified.

6. The combination of a valve, with valve-operating mechanism comprising a lever, a second lever, a cam connecting said levers, a rock-shaft, and mechanism connecting said shaft and cam whereby the rocking of said shaft rocks said cam, substantially as specified.

7. The combination of a valve, with valve-operating mechanism comprising a rotary shaft, a pulley operatively connected with said shaft, a stop for engaging and holding said pulley, means for disengaging said pulley, means for rotating said pulley when disengaged, and automatic mechanism for reëngaging said pulley by said stop, substantially as specified.

8. The combination of a valve with valve-operating mechanism comprising a rotary wheel, a stop for engaging and holding said wheel, an oscillating lever, and mechanism connected with said stop whereby said lever disengages said stop from the wheel and is disengaged to permit said stop to reëngage said wheel, substantially as specified.

9. The combination of a valve with valve-operating mechanism comprising a rotary wheel having a boss thereon, a movable stop adapted for engaging said boss, an oscillating lever, and mechanism connected with said stop whereby said lever disengages said stop from said boss and is disengaged to permit said stop to reëngage said boss, substantially as specified.

10. The combination of a valve with valve-operating mechanism comprising a rotary wheel, a movable stop for engaging and holding said wheel, a latch fulcrumed on said stop, a lever having means for engaging said latch and disengaging said stop from the wheel, means for disengaging said latch and lever, and means for reëngaging said stop and holding said wheel, substantially as specified.

11. The combination of a valve with valve-operating mechanism comprising a rotary wheel having a boss thereon, a movable stop for engaging said boss and holding said wheel, a latch fulcrumed on said stop in the path of said boss, and a lever for engaging said latch and disengaging said stop from the wheel, said latch being disengaged from said lever by said boss, substantially as specified.

12. In a valve-operating mechanism, in combination with a pair of valves, a pair of levers, a second pair of levers, cams connecting said pairs of levers, a rotary shaft having cams thereon in engagement with said second pair of levers, a gear-wheel for operating said shaft, a pinion for operating said gear-wheel, and means for intermittently operating said pinion, substantially as specified.

13. In a valve-operating mechanism, in combination with valves, a rotary shaft, cams on said shaft, levers operated by said cams, fulcrumed cams operated by said levers, means operated by said fulcrumed cams for actuating said valves, and mechanism for operating said shaft intermittently, substantially as specified.

14. The combination of a valve with valve-operating mechanism comprising a shaft, a cam on said shaft, a fulcrumed cam, means for supporting said fulcrumed cam and engaged by said first cam, means for transmitting the movement of said fulcrumed cam to said valve, a shaft connected with and operating said fulcrumed cam, and means controlled by said second shaft for operating said first shaft, substantially as specified.

15. The combination of a valve with valve-operating mechanism comprising a revoluble shaft, a pulley and a pinion on said shaft, a second revoluble shaft, a cam and a spur-wheel on said second shaft, a fulcrumed cam, means for supporting said fulcrumed cam and engaged by said first cam, means for transmitting the movement of said fulcrumed cam to said valve, a shaft connected with said fulcrumed cam, and a belt-shifter connected with said last-named shaft, substantially as specified.

16. In a valve-operating mechanism, in combination with a set of valves, a set of levers for operating said valves, a set of fulcrumed cams for operating said levers, a set of levers for supporting said cams, a set of cams for operating said last-named levers, and means for intermittently operating said last-named cams, substantially as specified.

17. In a valve-operating mechanism, in combination with a set of valves, a revolving shaft, a set of cams on said shaft, means whereby said cams operate said valves, a spur-wheel on said shaft, a second shaft, a pinion on said second shaft engaging said spur-wheel, a pulley on said second shaft, a belt for operating said pulley, a third shaft, and a belt-shifter operated by said third shaft, substantially as specified.

In testimony whereof we have hereunto set our hands this 26th day of May, 1904, in the presence of the subscribing witnesses.

EMERSON CARL.
HARRY COULSTON.

Witnesses:
LYNDELL MYERS,
CHARLES N. BUTLER.